United States Patent Office 2,781,255
Patented Feb. 12, 1957

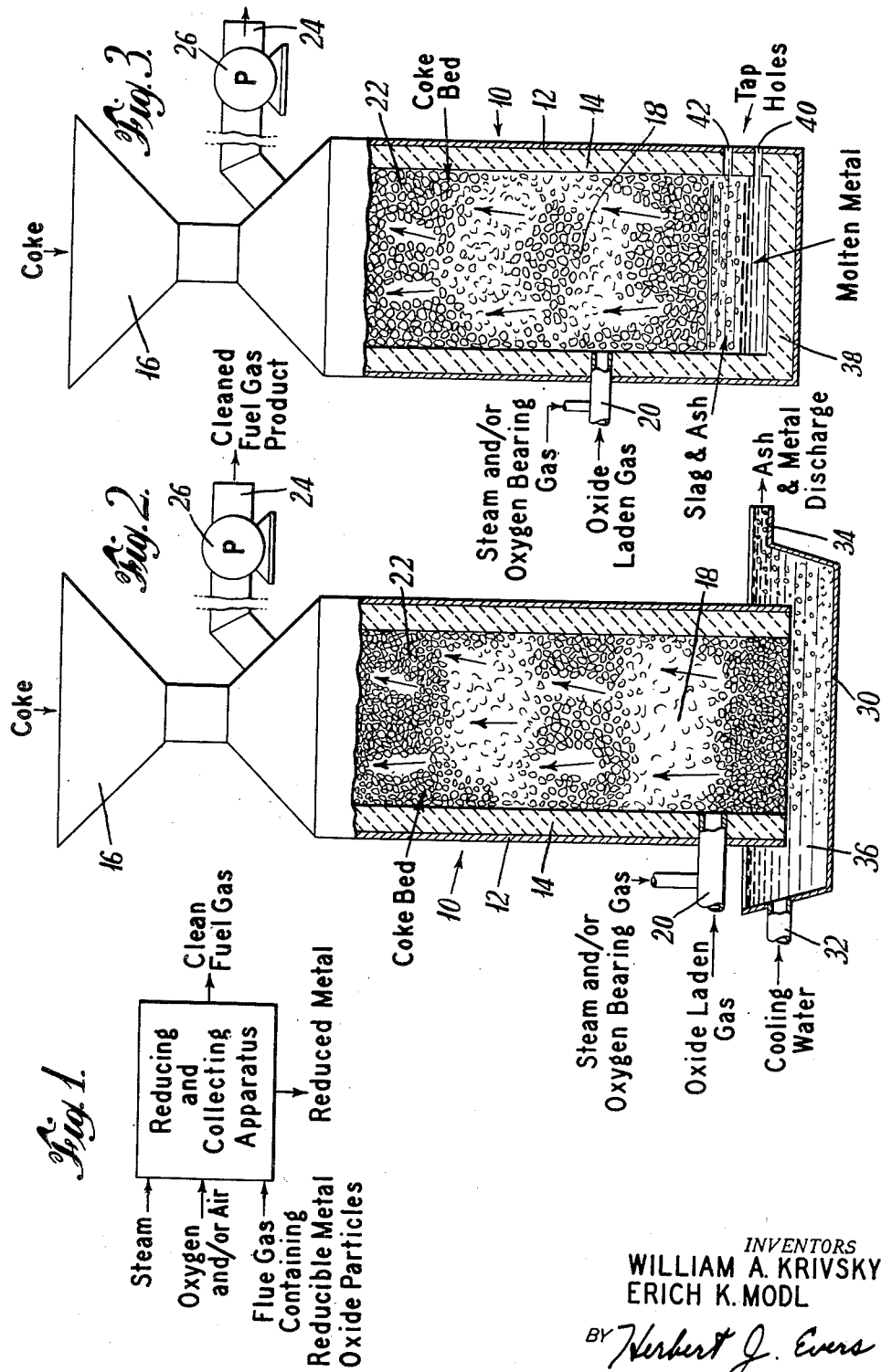

2,781,255

TREATMENT OF FUMES CONTAINING SUSPENDED SOLIDS

William A. Krivsky, Tonawanda, and Erich K. Modl, Niagara Falls, N. Y., assignors to Union Carbide and Carbon Corporation, a corporation of New York Application November 16, 1955, Serial No. 547,182

8 Claims. (Cl. 75—25)

This invention relates to an improved method and apparatus for the treatment of gases containing suspended solids, and particularly for the treatment of gases contaminated by dust particles in the sub-micron size range.

The flue gases produced in metallurgical operations often contain dust particles in sufficient quantity to cause considerable air contamination if they are released into the atmosphere without preliminary treatment. Heretofore, dust separating equipment of the cyclone or electrostatic precipitator type has been found to be most suitable for the treatment of these contaminated gases. However, in some industrial processes, such as for example, in the oxidation of impurities in molten metal by top-blowing the molten metal with oxygen or oxygen-enriched air, the fumes given off contain very small particles of metal oxides in the sub-micron particle size range. These particles are of such fine size that only expensive electrostatic precipitating apparatus may be employed in the purification of the fumes. In order that metallurgical cleansing operations of the above type be carried out under more favorable economic circumstances, it is necessary that a less costly manner of removing these fine furnace flue dusts be found.

It is, therefore, a principal object of the present invention to overcome the aforesaid difficulties, and to provide in the treatment of gases having undesirable solid particles suspended therein, an improved method and apparatus for separating particles in all size ranges, and at the same time provide separating equipment of good efficiency and of relatively low cost.

Another object of the present invention is to provide a novel continuous method of reducing suspended particles of carbon reducible metal oxides in a flue gas, and recovering the resulting metal values therefrom.

Yet another object of the present invention is to provide a novel system of separating finely-divided suspended solids from a gas primarily by chemical action, whereby the cleaned gas may be subsequently employed as a gaseous fuel.

In the drawings:

Fig. 1 is a simplified flow chart of the method of the present invention;

Fig. 2 is a sectional elevational view of an illustrative dust separating apparatus embodying the principles of the present invention; and Fig. 3 is a view similar to Fig. 2, but showing a modification thereof.

For the purposes of explanation and illustration of the invention, reference is made to flue gas containing iron oxide particles in the sub-micron size range, to which the invention is particularly adapted. Referring to the flow chart in Fig. 1, the method of the invention is carried out in a novel one-step procedure which comprises passing the iron oxide-contaminated flue gas through a heated column of coke particles. The entrained iron oxide particles are reduced to metallic iron in one portion of the column, and the flue gas is purified of suspended solids as it travels the length of the column. While the mechanics of the reaction which takes place in the column are not entirely understood, it is believed to involve a combination of chemical reduction and adsorption. Simultaneously with admission of the flue gas into the coke column, steam and/or oxygen may also be introduced in sufficient quantities to control the reaction temperature in the reducing portion of the column. However, it should be understood that other means of heating and temperature control may be employed in the practice of the invention. Depending upon the composition of the flue gas and any gases added thereto, the resulting gas may have a heating value comparable to water gas, and will be substantially free of solids. Control of the physical state in which the reduced, metallic iron occurs may be effected by varying the ratio of steam of oxygen input into the coke column, a higher ratio of steam to oxygen being necessary to recover metallic iron in solid state rather than as a liquid.

A dust separating and fuel producing equipment 10 embodying the features of the present invention may comprise a vertical steel column or shaft 12 provided with a refractory lining or insulating jacket 14, and having one or more conventional charging chutes 16 at the top of the shaft for the introduction of carbonaceous material, such as coke. In order to achieve an effective system for chemically reducing the very fine suspended oxide particles, the coke should be suitably sized, preferably ½ inch to 4 inches in diameter, the particle size depending upon the diameter and height of the column, in which form it also provides a suitable gas-permeable coke bed capable of flow by gravity down the shaft 10 through a stream of upwardly moving flue gas. In accordance with accepted practice of passing gas through a packed column, the coke particles should be of such size as to provide a free space between 35% and 65% of the column volume.

The dust-containing, flue gas to be treated is admitted into the reducing zone 18 of the separating equipment 10 through an inlet conduit 20, passing through a suitable gas-tight opening near the lower end of the shaft wall 12 and lining 14. The gas is drawn through the coke bed 22 to the top of the column and removed through an off-take or exhaust pipe 24 by means of a suction blower 26.

In carrying out the invention, steam and air or oxygen-enriched air may be introduced into the reducing zone 18 of the coke column to react with the coke particles. The steam and air may be charged through a separate inlet into the reducing zone, or may be mixed with the flue gas to be treated and introduced through the single conduit 20, the latter being shown and illustrated in the drawings. The combustion products thus formed mix with the flue gas to provide a combustible fuel mixture having a high calorific value. Upward passage of this fuel mixture through the coke bed results in a fuel gas product which is substantially free of suspended solids.

Control of the physical form of the metallic iron formed in the reduction zone 18 is achieved in the present invention by regulating and controlling the temperature in the reduction zone. Thus, to recover the iron in solid form, a flow of steam may be introduced into the coke column at a rate sufficient to sustain a reaction zone temperature in said column for the reduction of the metal oxide contaminants, but at a temperature substantially below the melting range of high-carbon iron. Recovery of the metallic iron in liquid form may be effected by decreasing the ratio of steam to flue gas input into the coke column so that reaction zone temperatures substantially above the melting range of high carbon iron are encountered.

Illustrated in Fig. 2 is a construction which may be used in the separation of iron oxide dusts, which is adapted to reduce the finely divided iron oxide particles at temperatures below the melting point of the iron constituent to be recovered.

A pan 30 disposed beneath the end of the column 12 is provided with a cooling water inlet connection 32 and an overflow lip 34 to form a water seal 36 for the column. This water seal cools the column discharge, consisting of discrete coke ash particles and metallic iron, and by conventional means discharges it over the lip 34. Thereafter, the ash and metallic iron may be separated using conventional physical separation methods should recovery of the iron constituent be desired.

In the modification shown in Fig. 3, the lower end of the column 12 is terminated with a refractory-lined, bottom wall 38 to receive the molten discharge of the column. By providing tap holes 40, 42 at different levels in the shaft wall 12, slightly above the bottom wall 38, molten iron and slag and ash impurities, respectively, may be periodically or continuously tapped and removed from the separating equipment. An obvious advantage of this construction is that a low grade coke may be used and that the metal values may be recovered in liquid form for subsequent purposes.

The following example is illustrative of the beneficial results achieved in the practice of the invention. A 100 pound melt of pig iron was top blown, using pure oxygen, to make steel. A typical, heavy reddish brown fume, consisting mainly of iron oxide particles of sub-micron size, was generated. This fume was passed through a six foot graphite tube furnace of 3 inch diameter filled with uniformly sized one inch coke particles, the coke column having a reducing zone temperature of approximately 1000° C. Using a Staplex air sampler to determine the solid content in the exhaust fumes, there was no evidence of the slightest trace of any solid particles in the gas.

From the above it will be seen that the present invention affords a novel continuous process and apparatus for the treatment of dust-laden gases containing carbon-reducible metal oxide particles including the sub-micron particle size range, wherein the suspended particles are chemically reduced and separated by passing the gas through a column of coke particles.

It will be understood that although the invention is described in terms of the separation of iron oxide particles from a flue gas, other important metal values such as manganese are simultaneously recovered. The invention is also susceptible of application in allied fields where other carbon reducible oxide particles, particularly of the sub-micron size, are encountered, without departing from the spirit and scope of the novel concepts of the present invention. Furthermore, the reducing reaction temperatures can be obtained by method other than direct combustion of a coke as described herein, such as electrical heating or gas heating.

What is claimed is:

1. In the art of recovering metal values from a flue gas contaminated with suspended particles of reducible metal oxides, the improvement which consists in introducing the contaminated flue gas into a heated column of carbonaceous particles having a sufficiently high temperature to reduce said suspended metal oxides to their metallic forms, and causing the flue gas to travel the length of the column to separate said metals from said flue gas, thereby producing a gas product substantially free of suspended contaminants.

2. In the art of recovering metal values from an oxygen-containing flue gas contaminated with suspended particles of reducible metal oxides, the improvement which consists in introducing the contaminated flue gas into a heated column of carbonaceous material, introducing a quantity of steam sufficient to control the reaction temperature in said column for the chemical reduction of said suspended particles of metal oxides to the desired physical state, causing the flue gas to travel the length of the column to separate said metals to produce a gaseous fuel product which is substantially free of suspended contaminants.

3. In the art of purifying gas contaminated with suspended particles of iron oxide, the improvement comprising providing a column of coke particles wherein the coke particles are introduced into said column at the top thereof, and the contaminated gas is introduced into and reduced at the bottom thereof, and separated as it progresses up the column, introducing into said column a quantity of oxygen-bearing gases and steam sufficient to control a reaction zone temperature in said column for the chemical reduction of the iron oxide contaminants, regulating the physical state in which the reduced iron occurs by varying the ratio of steam to oxygen input into said column, withdrawing gaseous fuel product from the top of the coke column, and removing coke ash and iron particles from the bottom of the coke column.

4. In the art of purifying gas contaminated with suspended particles of iron oxide, the improvement comprising providing a column of coke particles wherein the coke particles are introduced into said column at the top thereof, and the contaminated gas is introduced into and reduced at the bottom thereof and separated as it progresses up the column, introducing into said column a quantity of steam and oxygen sufficient to control a reaction zone temperature in said column for the reduction of the iron oxide to liquid metal, withdrawing gaseous fuel product from the top of the coke column, and removing coke ash and liquid iron from the bottom of the coke column.

5. In the art of purifying gas contaminated with suspended particles of iron oxide, the improvement comprising providing a column of coke particles wherein the coke particles are introduced into said column at the top thereof, and the contaminated gas is introduced into and reduced at the bottom thereof and separated as it progresses up the column, introducing with said contaminated gas a quantity of steam sufficient to sustain a reaction zone temperature in said column for the reduction of the iron oxide to solid metal, withdrawing gaseous fuel product from the top of the coke column, and removing coke ash and iron particles from the bottom of the coke column.

6. A column for the purification of a flue gas contaminated with suspended particles of reducible metal oxides, comprising a hollow shaft having at the top thereof means for introducing coke particles into said column, and suction means for withdrawing gas product substantially free of suspended contaminating particles from the top of said column, an opening adjacent the bottom of said column for admitting the contaminated flue gas in contact with coke particles, and a discharge opening at the bottom of said column for removing coke ash and iron particles.

7. A column for the purification of a flue gas contaminated with suspended particles of carbon reducible metal oxides comprising a coke-filled columnar shaft having at the top thereof, means for introducing coke particles into said column and suction means for withdrawing gas product substantially free of suspended contaminating particles, an inlet opening near the bottom of said column for the admission of the flue gas, a reducing zone in said coke adjacent said inlet opening for the reduction of said metal oxides to their metallic state, a discharge opening at the bottom of said column for the removal of the metals and burned coke, and a separation zone in said coke between said reducing zone and said suction means whereby through the combination of said reducing and separating zones, the flue gas is substantially free of contamination and recovery of the metal values in the suspended contaminants in said flue gas may be effected.

8. A column for the purification of flue gas contaminated with suspended particles of iron oxide, comprising a coke-filled columnar shaft having at the top thereof means for introducing coke particles into said column and suction means for withdrawing gaseous fuel product substantially free of suspended contaminating particles, an inlet opening near the bottom of said column for the admission of said contaminated flue gas, an additional inlet opening for the introduction of steam and oxygen near the bottom of said column, a reducing zone in said coke adjacent said inlet openings, a discharge opening in said column below said reducing zone for the removal of the iron values in said suspended particles of iron oxide and the burned coke, and a separating zone in said coke between said reducing zone and said suction means, whereby through the combination of said reducing and separating zones purification of the flue gas may be effected, and whereby through the proportioning of the fuel to steam inputs into said coke column, a gaseous fuel product may be produced.

No references cited.